US007332013B2

(12) United States Patent
Arno et al.

(10) Patent No.: US 7,332,013 B2
(45) Date of Patent: *Feb. 19, 2008

(54) COMPRESSED AIR/GAS-DRIVEN TOOL WITH INTEGRATED DRYNESS INDICATOR

(76) Inventors: Michael J. Arno, 5850 Kraus Rd., Clarence, NY (US) 14031; Daniel Blaszkowiak, 93 Woodgate Dr., Cheektowaga, NY (US) 14227; Allan R. Blount, 1018 Marshall Rd., Lyndonville, NY (US) 14098; Raymond L. Cahill, 71 Maldner Ave., Tonawanda, NY (US) 14150

( * ) Notice: Subject to any disclaimer, the term of this patent is extended or adjusted under 35 U.S.C. 154(b) by 489 days.

This patent is subject to a terminal disclaimer.

(21) Appl. No.: 10/931,471

(22) Filed: Sep. 1, 2004

(65) Prior Publication Data

US 2005/0199403 A1 Sep. 15, 2005

Related U.S. Application Data

(60) Provisional application No. 60/581,891, filed on Jun. 22, 2004, provisional application No. 60/553,163, filed on Mar. 15, 2004.

(51) Int. Cl.
*B01D 53/02* (2006.01)
*G01N 19/10* (2006.01)

(52) U.S. Cl. .................... 55/518; 55/DIG. 17; 422/86; 73/29.04; 73/29.05; 239/DIG. 14

(58) Field of Classification Search ............... 96/117.5, 96/147, 416, 417; 55/516–519, 385.1, DIG. 17; 422/58, 86; 34/89; 116/276; 239/71, DIG. 14; 73/23.2, 29.04, 29.01, 29.05
See application file for complete search history.

(56) References Cited

U.S. PATENT DOCUMENTS 1,681,531 A 12/1926 Gannon (Continued)

FOREIGN PATENT DOCUMENTS

EP 0042683 A1 12/1981
JP 54-46185 A 4/1979

OTHER PUBLICATIONS

Viskon-Aire, Camair TS-10 Desiccant Air Dryer, Nov. 1992, 2 pages.

*Primary Examiner*—Frank M. Lawrence
(74) *Attorney, Agent, or Firm*—Walter W. Duft

(57) ABSTRACT

An air/gas-driven tool with an integrated air/gas dryness indicator. The tool includes a housing that defines a cavity. An air/gas dryness detector is disposed in the cavity. An air/gas flow passage is situated to provide a stream of compressed air/gas to the dryness detector. A visual indicator is adapted to provide an indication of compressed air/gas dryness detected by the dryness detector. The tool can be constructed so that the air/gas dryness indicator is provided by way of a removable indicator cartridge containing a dryness-indicating material such as a color changing desiccant or moisture sensitive paper. The indicator cartridge can be sized and configured to be received in a cavity formed in a housing of the air/gas-driven tool, so as to be viewable through a view port formed in the tool. Alternatively, the indicator cartridge can be configured with its own view port and mounted on a surface of the tool while being partially received in the cavity. The air/gas dryness indicator can also be provided with an electromechanical dryness detector and a numeric display that displays relative humidity, dew point temperature, or both.

51 Claims, 7 Drawing Sheets

U.S. PATENT DOCUMENTS

| | | | | | |
|---|---|---|---|---|---|
| 1,839,350 | A | | 1/1932 | Slagel | |
| 1,866,659 | A | | 7/1932 | Litle, Jr. | |
| 2,214,925 | A | | 8/1937 | Gutrie | 252/2 |
| 2,199,258 | A | | 4/1940 | Gray | 210/131 |
| 2,234,499 | A | * | 3/1941 | McAllister | 422/86 |
| 2,273,779 | A | | 2/1942 | Dickey et al. | 183/75 |
| 2,325,657 | A | | 8/1943 | Burkness | 210/134 |
| 2,526,782 | A | | 10/1950 | Thorpe | 183/45 |
| 2,526,938 | A | | 10/1950 | Davis et al. | 252/408 |
| 2,536,274 | A | | 1/1951 | Gaugler | 210/131 |
| 2,554,879 | A | * | 5/1951 | Race, Jr. | 96/117.5 |
| 2,558,125 | A | * | 6/1951 | Cullen | 55/433 |
| 2,579,053 | A | | 12/1951 | Schulstadt | 210/131 |
| 2,593,132 | A | | 4/1952 | Gannon | 183/4.8 |
| 2,649,923 | A | | 8/1953 | Woppman | 183/4.8 |
| 2,671,526 | A | | 3/1954 | Hunt et al. | 183/4.8 |
| 2,671,528 | A | | 3/1954 | Gross | 183/49 |
| 2,751,999 | A | | 6/1956 | Semon | 55/513 |
| 2,845,138 | A | | 7/1958 | Gageby | 183/4.8 |
| 2,987,175 | A | | 6/1961 | Bottum | 206/46 |
| 3,008,540 | A | | 11/1961 | Gibson, Jr. | 96/121 |
| 3,029,581 | A | | 4/1962 | Robbins | 55/316 |
| 3,047,993 | A | | 8/1962 | Robbins | 55/274 |
| 3,085,424 | A | * | 4/1963 | Berg | 73/29.02 |
| 3,090,490 | A | | 5/1963 | Yocum | 210/299 |
| 3,169,112 | A | | 2/1965 | Nelson | 210/266 |
| 3,209,917 | A | | 10/1965 | Yelinek | 210/484 |
| 3,240,567 | A | | 3/1966 | Caparreli et al. | 23/284 |
| 3,246,758 | A | | 4/1966 | Wagner | 210/94 |
| 3,358,428 | A | | 12/1967 | Mann | 55/387 |
| 3,415,041 | A | | 12/1968 | Kraissl, Jr. | 55/342 |
| 3,464,186 | A | | 9/1969 | Hankison et al. | 55/163 |
| 3,479,146 | A | | 11/1969 | Hochman et al. | 23/288 |
| 3,585,963 | A | * | 6/1971 | Hiszpanski | 116/206 |
| 3,681,899 | A | | 8/1972 | Grote | 55/503 |
| 3,705,480 | A | | 12/1972 | Wireman | 55/275 |
| 3,724,177 | A | | 4/1973 | Grote | 55/316 |
| 3,941,573 | A | | 3/1976 | Chapel | 55/316 |
| 4,162,826 | A | * | 7/1979 | Van der Beck et al. | 359/894 |
| 4,177,049 | A | | 12/1979 | Haslett, Jr. | 55/483 |
| 4,464,186 | A | * | 8/1984 | Mann | 96/135 |
| 4,478,619 | A | | 10/1984 | Arends et al. | |
| 4,548,624 | A | | 10/1985 | Waller | 55/274 |
| 4,612,026 | A | | 9/1986 | Pollara et al. | 96/117.5 |
| 4,705,543 | A | | 11/1987 | Kertzman | 96/6 |
| 4,741,697 | A | | 5/1988 | Herbison | 433/25 |
| 4,746,338 | A | | 5/1988 | Williams | 55/275 |
| 4,770,678 | A | | 9/1988 | Haslett, Jr. | 55/179 |
| 4,811,571 | A | | 3/1989 | Mayer | 62/474 |
| 4,822,387 | A | | 4/1989 | Daniels | 55/323 |
| 4,993,460 | A | * | 2/1991 | Robinson et al. | 141/94 |
| 4,999,035 | A | * | 3/1991 | Warndorf | 96/117.5 |
| 5,110,330 | A | | 5/1992 | Loughran | 55/275 |
| 5,240,483 | A | | 8/1993 | Rosen | 96/137 |
| 5,350,442 | A | | 9/1994 | Thelen et al. | 95/115 |
| 5,427,609 | A | | 6/1995 | Zoglman et al. | 95/98 |
| 5,580,451 | A | | 12/1996 | Tack | 210/266 |
| 5,630,855 | A | | 5/1997 | Lundbäck | 96/405 |
| 5,667,566 | A | | 9/1997 | Flynn et al. | 96/138 |
| 5,681,370 | A | | 10/1997 | McMahon | 95/105 |
| 5,683,499 | A | | 11/1997 | Kiyani | 96/147 |
| 5,746,807 | A | | 5/1998 | Thelen et al. | 95/123 |
| 5,846,271 | A | | 12/1998 | Flynn et al. | 55/315 |
| 6,309,450 | B1 | | 10/2001 | Millen et al. | 96/131 |
| 6,402,811 | B1 | | 6/2002 | Shanks et al. | 95/90 |
| 6,585,173 | B2 | | 7/2003 | Schmon et al. | 239/526 |
| 6,835,234 | B2 | | 12/2004 | Leffel et al. | 96/108 |
| 7,108,740 | B2 | * | 9/2006 | Arno et al. | 96/134 |
| 2005/0312887 | | | 6/2005 | Mitsch et al. | 96/108 |

* cited by examiner

COMPRESSED AIR/GAS-DRIVEN TOOL WITH INTEGRATED DRYNESS INDICATOR

CROSS-REFERENCE TO RELATED APPLICATIONS

This application claims benefit of the filing date of U.S. Provisional Application No. 60/581,891, filed on Jun. 22, 2004. This application also claims benefit of the filing date of U.S. Provisional Application No. 60/553,163, filed on Mar. 15, 2004.

BACKGROUND OF THE INVENTION

1. Field of the Invention

The present invention relates to the field of compressed air and gas systems, and more particularly to air/gas-driven tools, such as paint guns and other equipment. The present invention further relates to dryness indicators designed to visually indicate the moisture content of compressed gas or air delivered to a point of use.

2. Description of Prior Art

Typical compressed air or gas produced by a compressor apparatus is saturated with 50% to 100% relative humidity. Removal of this moisture vapor requires that an air/gas drying system be used, such as a refrigerated dryer or an adsorbent type of dryer. Such apparatus are generally very effective, the latter being typically capable of drying compressed air or gas to below-zero dew point levels. Notwithstanding such drying measures, there is unfortunately no guarantee that the compressed air or gas will have the desired dryness by the time it arrives through an air/gas feed system to a downstream point of use. Compressed air lines, various fitting and regulation devices, or improper operation of the dryer system all represent sources of residual moisture vapor entrainment in the air/gas feed system. This means that moisture-treated compressed air or gas may be carrying unwanted moisture vapor when it goes into use as an application.

One area where this problem tends to occur is in paint booth operations where compressed air or gas is used as a propellant to atomize and expel paint from a paint gun. Even though extraordinary measures are often implemented to eliminate moisture vapor at the compressed air/gas source, moisture can still be delivered to the paint gun. In some cases, this may be due to the drying system losing effectiveness due to a malfunction or other problem. However, even if the drying system is operating at full operational efficiency, the lengthy hoses connecting the air source to the paint gun can introduce unwanted moisture vapor into the system. In particular, these hoses can be disconnected and re-connected any number of times throughout the course of a painting application. Each time a disconnection occurs, moisture-laden ambient air is allowed to enter the air/gas line, and will feed through the paint gun until such time as it evacuated from the line and replaced by dry air/gas coming from the air/gas source. Any time there is excess moisture vapor in a paint gun, unwanted fouling can occur that results in a bad and unacceptable paint job. In most cases, the unsuspecting painter will assume the air/gas quality is satisfactory, particularly when there is sophisticated drying equipment operating at the air/gas source.

Various dryness indicators have been proposed for use in compressed air, gas and refrigerant applications. These typically involve the use of a moisture-adsorbing silica gel desiccant that is impregnated with a chemical moisture indicator, such as a cobalt salt. This particular chemical indicator is normally a deep blue color when it is dry, but gradually turns a light pink color in proportion to the amount of moisture that is present as the salt hydrates. In a dryness indicator, the color-indicating desiccant is placed in contact with a compressed air/gas stream within a transparent or translucent container, so that the desiccant can be viewed during operations.

Prior art dryness indicators tend to have design features that prevent them from being optimally suited for point-of-use operation in conjunction with a hand-held air/gas-driven tool, such as a paint gun, where moisture monitoring is most needed. In all of the reference materials reviewed, the prior art dryness indicators form part of a filter/dryer that requires a relatively large quantity of desiccant to effectively remove moisture for a reasonable length of time. This quantity of desiccant is more than that which is required to indicate dryness. The filter/dryers in which prior art dryness indicators are incorporated also tend to include additional elements to condense and remove moisture droplets from the air/gas stream, and to trap oil, line debris and other contaminants. As a result of the foregoing design features, most prior art dryness indicators are large or bulky, and not suitable for point-of-use operation.

It is to solving the foregoing problems that the present invention is directed. What is particularly needed is an improved compressed air/gas dryness indicator that is optimized for point-of-use operation with an air/gas-driven tool, such as a paint gun. Ideally, the dryness indicator needs to provide a visual indication identifying the exact state of dryness of the compressed air/gas line, yet must be unobtrusive and afford full freedom of movement at the point-of-use without any impediment of bulky filters, desiccant containers, cumbersome vessels, etc. The dryness indicator additionally needs to be easy to install and use, should be simple and inexpensive, and should require little or no maintenance.

SUMMARY OF THE INVENTION

The foregoing problems are solved and an advance in the art is achieved by a novel air/gas-driven tool having an air/gas dryness indicator integrated therewith. In exemplary embodiments of the invention, the dryness indicator is implemented by way of a dryness-indicating material, such as a color-changing desiccant or moisture sensitive paper, that is disposed in a cavity formed as part of the tool's air/gas flow passage. One or more view ports are provided at convenient locations for viewing the dryness-indicating material. The dryness-indicating material can be conveniently carried in an indicator cartridge that is in fluid communication with the cavity. The indicator cartridge represents a replaceable active element that can be renewed from time-to-time during the operational life of the tool. The indicator cartridge may include a vessel that defines a containment chamber for containing the dryness-indicating material.

In one embodiment in which the indicator cartridge is completely received within the air/gas-driven tool, the vessel is configured with a first and second ends and a central portion disposed between said first and second ends. The central portion of the vessel defines a containment chamber for containing the dryness-indicating material. This portion of the vessel is light transmissive so that the dryness-indicating material can be viewed externally of the vessel, through one or more view ports formed on the tool. A pair of air/gas-permeable closures cap the ends of the vessel in order to retain the dryness-indicating material therein. The closures also respectively perform pre-filtering and after-filtering functions. Each closure includes a non-planar central portion that creates a protuberance on a first side thereof extending into the containment chamber, and a plenum-defining cavity on a second side thereof facing away from the containment chamber. A seating spacer is placed in the cavity on the inlet side of the indicator cartridge in order to retain the cartridge in an installation position and provide an additional plenum. The cavity is closed by a retainer fitting that can be removed to facilitate insertion and removal of the indicator cartridge.

In another embodiment in which the indicator cartridge is mounted on a surface portion of the air/gas-driven tool and includes its own view port, the vessel containing a dryness-indicating material is configured with an air/gas permeable first end in fluid communication with the tool's air/gas flow passage and a non-permeable second end that is light transmissive so that the dryness-indicating material can be viewed externally of the vessel, with second end of the vessel providing the view port.

The invention is further directed to a replacement indicator cartridge that can be inserted within or mounted on a surface of an air/gas-driven tool when new dryness-indicating material is required. The invention additionally contemplates an alternative air/gas dryness indicator that is implemented by way of an electromechanical moisture detector and a numeric display that displays such air/gas dryness parameters as relative humidity, dew point temperature, or both. The invention likewise contemplates the use of additional numeric displays for indicating other compressed air/gas characteristics, such as flow, temperature, pressure and possibly pH.

BRIEF DESCRIPTION OF THE DRAWINGS

The foregoing and other features and advantages of the invention will be apparent from the following more particular description of exemplary embodiments of the invention, as illustrated in the accompanying Drawings in which.

DETAILED DESCRIPTION OF EXEMPLARY EMBODIMENTS

Figure 1:
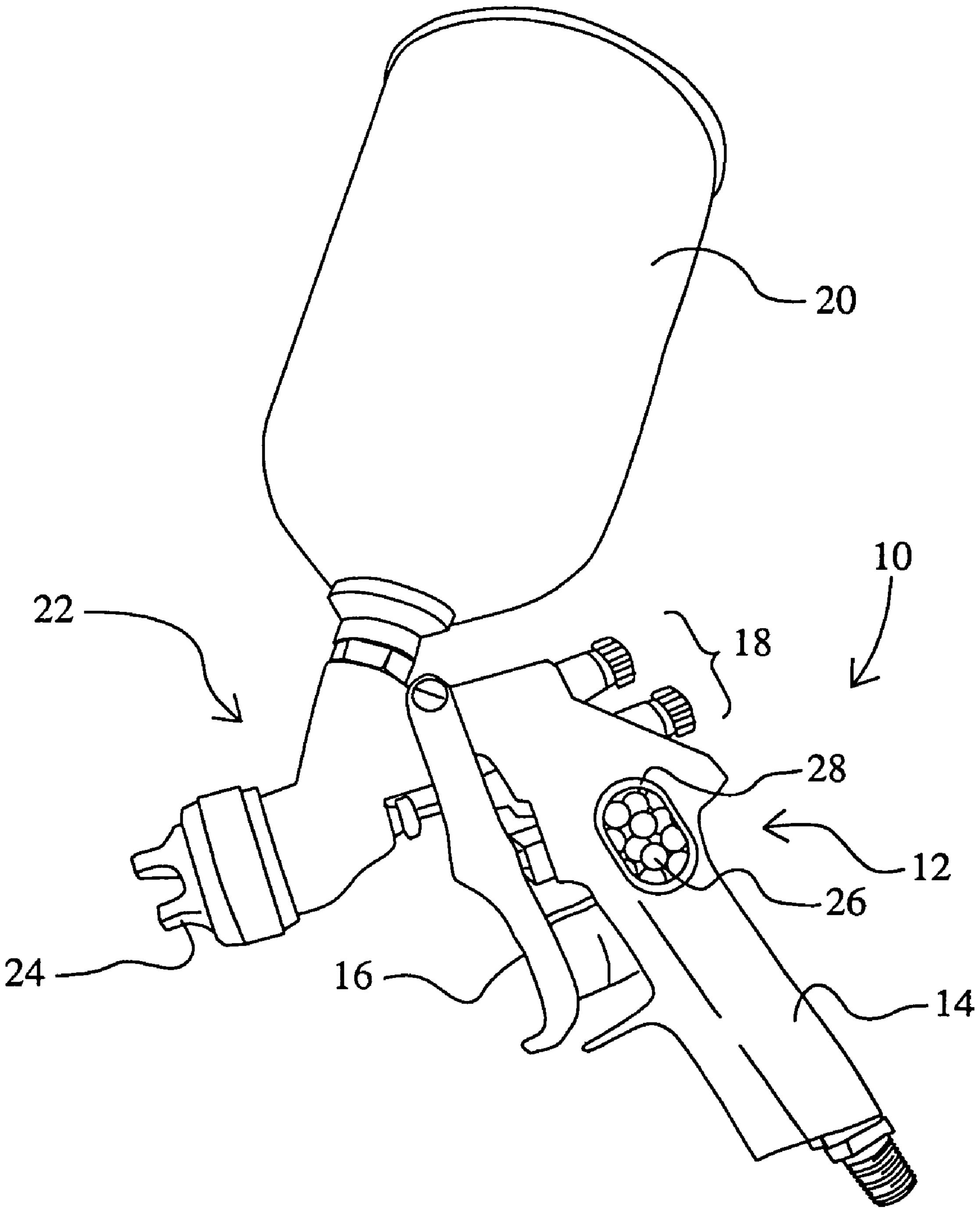
FIG. 1 is a perspective view showing an air/gas-driven tool with integrated dryness indicator constructed in accordance one exemplary embodiment of the present invention.

Turning now to the drawings, wherein like reference numerals indicate like elements in all of the several views, FIG. 1 illustrates an air/gas-driven tool 10 with an integrated air/gas dryness indicator 12. The tool 10 is configured, by way of example only, as a paint gun. In this configuration, the tool conventionally includes a handle assembly 14, a trigger 16, a set of adjustable control knobs 18 for controlling paint spray, a paint supply canister 20, and a dispenser assembly 22 terminating at a paint dispensing nozzle 24. The dryness indicator 12 provides a visual indication of the moisture content of compressed air or gas passing through the tool 10. In the exemplary embodiment of FIG. 1, the dryness indicator 12 is implemented by way of a quantity of dryness-indicating material 26, such as a color-changing desiccant, that is disposed in a cavity formed within the tool 10. The dryness-indicating material 26 functions as a dryness detector and also indicates dryness due to its ability to change its appearance (e.g., its color) in the presence of moisture. One or more view ports 28 are situated adjacent to the cavity to act as visual indicators so that the dryness-indicating material 26 therein can be viewed.

Figure 2:
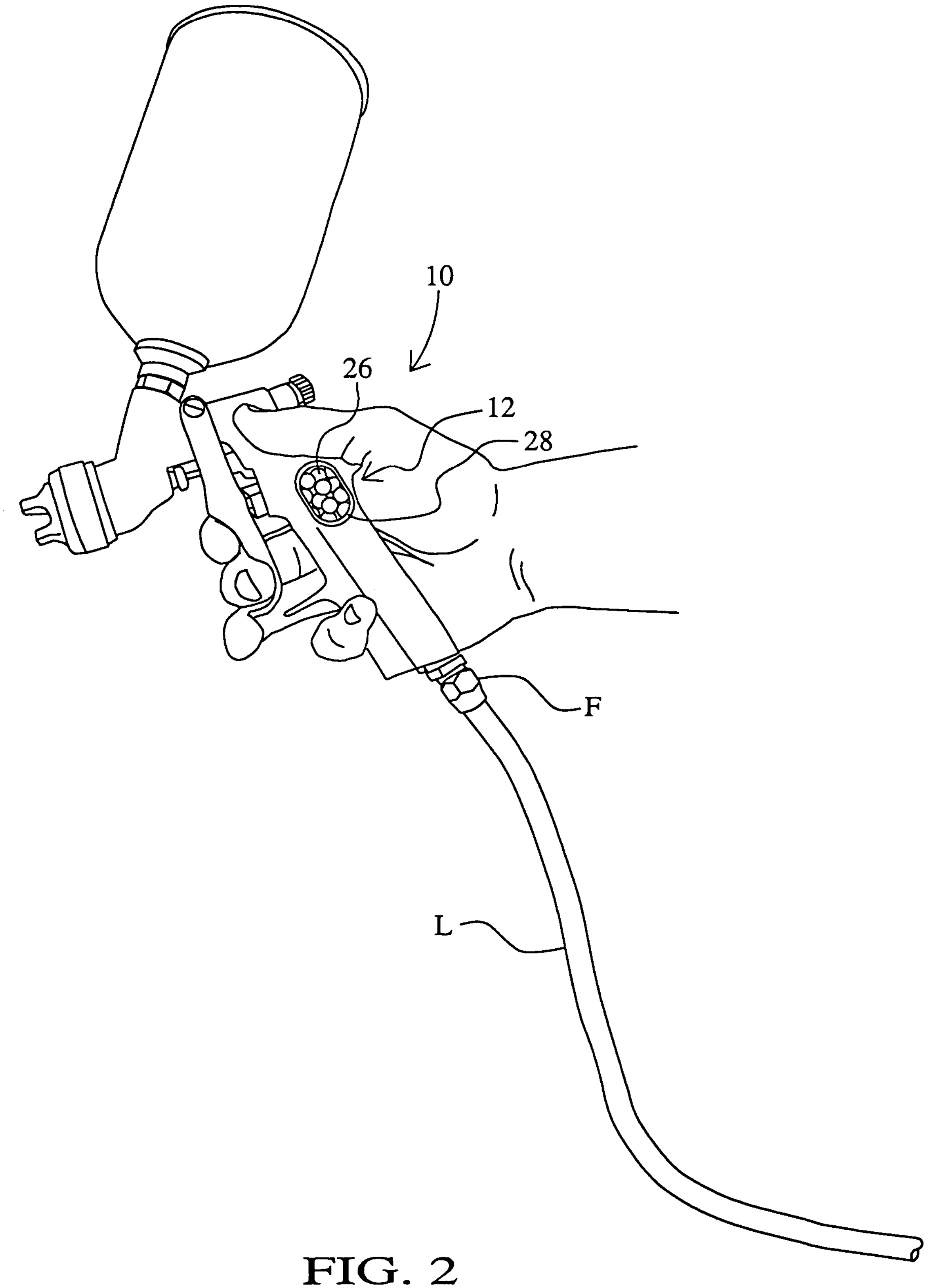
FIG. 2 is a perspective view of the tool of FIG. 1 connected to a compressed air/gas hose line and being held by user in an operational position.

FIG. 2 illustrates the tool 10 mounted to a connector fitting "F" of a conventional compressed air/gas hose line "L," with the tool being held in an exemplary operational position (e.g., for painting a surface in the illustrated paint gun embodiment of the tool). In this orientation, the integrated dryness indicator 12 can be readily viewed while the tool 100 is being used insofar as the view port 28 will normally always be in the line of sight of a person working on a workpiece, such as a surface to be painted. As will become apparent from the further description to follow, the integrated indicator 12 is compact and unobtrusive, convenient to use, and does not in any way interfere with normal operation of the tool 10.

Figures 3, 3A:
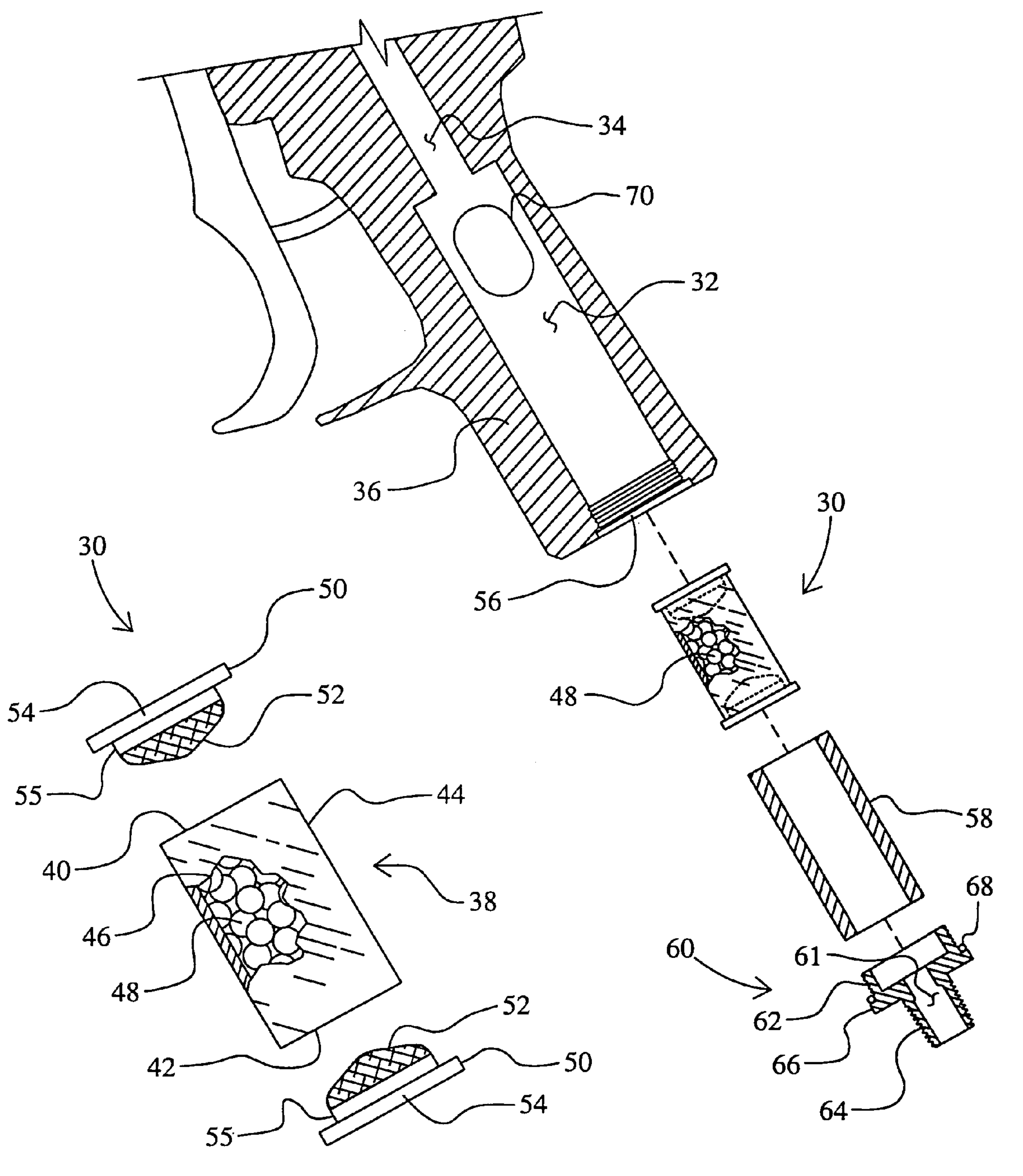
FIG. 3 is an exploded cross-sectional centerline view of a handle portion of the integrated tool of FIG. 1 showing in partial cross-section the details of an exemplary indicator cartridge that is inserted in a cavity in the handle.
FIG. 3*a* is an enlargement of the partial cross-sectional view of the indicator cartridge of FIG. 3.

Turning now to FIGS. 3 and 3*a*, an indicator assembly 30 constructed as removable cartridge can be used to contain the dryness-indicating material 26 of FIG. 1. To receive the indicator cartridge 30, a cavity 32 is formed as an enlargement of an air/gas flow passage 34 within a handle housing 36 of the tool 10. The indicator cartridge 30 includes a vessel 38 having a first end 40, a second end 42, and a central portion 44 disposed between the first and second ends. The vessel 38 is preferably generally tubular in shape, but it will be appreciated that other cross-sectional configurations could be used. The central portion 44 is formed by a light transmissive material, such as fire-polished borosilicate glass, or other suitable material that is either transparent or translucent. The central portion 44 defines a containment chamber 46 for containing a color-changing desiccant 48, such as a quantity of silica gel beads treated with a moisture sensitive, color-indicating material, like a cobalt salt. The desiccant beads have a bead diameter of between about 0.1 to 0.125 inches in order to provide good moisture sensitivity and visibility (which could be diminished if the beads are too large) without introducing undue pressure drop (which could occur if the beads are too small).

As an alternative to using the desiccant 48, a moisture sensitive paper that turns color according to the surrounding moisture content could be used. For example, as is conventionally known, when Bromide salts are distributed on litmus paper, a color change from light lime green to deep yellow will be exhibited as the relative humidity increases in the air/gas to which the paper is exposed. The relative humidity level at which this color change occurs can be formulated according to the distribution of the Bromide salt material on the paper. This implies that the moisture indicating characteristics of the paper can be adjusted according to the application. Thus, for tools requiring very dry air, the moisture sensitive paper could be designed so that the color change occurs at a low relative humidity threshold, such as about 10-20%. Higher relative humidity thresholds could be used for tools that are not as sensitive to moisture. It will be appreciated that other known varieties of moisture sensitive paper may also be used to produce different colors at different levels of moisture content.

In the event that moisture sensitive paper is used in lieu of the desiccant 48, the manner in which it is applied to the indicator cartridge 30, as well as the construction of the cartridge itself, can be varied in a number of ways. One technique would be to spray the moisture sensitive paper in particulate form onto the inside of the vessel 38, along with a suitable adhesive agent. Another technique would be to roll a sheet of the moisture sensitive paper into a tube and insert it into the vessel 38. A further option would be to spray or otherwise affix the moisture sensitive paper to a solid substrate that is then placed in the vessel 38, such as a flat plate, a disk, a cylinder, a sphere, etc. A further exemplary cartridge construction featuring moisture sensitive paper is discussed in detail below with reference to FIGS. 5 and 6.

The first and second ends 40 and 42 of the vessel 38 are capped by a pair of air/gas-permeable closures 50 that contain the desiccant 48 in the vessel 38 and also perform a filtering function. Each of the closures 50 is formed by a domed screen 52 and a peripheral member 54. The screens 52 extend substantially across the entire cross-sectional area defined by the ends 40 and 42 of the vessel 38, and must thus be permeable to the air/gas stream passing through the indicator cartridge 30. The screen 52 can be made from any suitable air/gas permeable material provided it is also strong enough to perform its function of retaining the desiccant 48 within the containment chamber 46. A perforated metal sheet made from stainless steel or the like, or a metal weave, is preferred. A sieve size of about 50 mesh may be used if the dryness indicating material 48 comprises silica gel beads. This sieve size is sufficiently small to trap desiccant bead particles that can be produced on the outlet end of the indicator cartridge 30 should the beads fracture and break apart during use of the indicator cartridge 30, yet is not so small as to produce unwanted pressure drop. Thus, the closure 50 at the outlet end of the indicator cartridge 30 will function as an after filter. At the inlet end of the indicator cartridge, the closure 50 will help pre-filter unwanted particulates such as dirt and oil.

The peripheral member 54 of each closure 50 can be made from various materials, including silicone rubber, plastic, etc. The peripheral member 54 are generally ring shaped, and may also comprise annular stub portions 55 that extend into the vessel 38 a short distance, if a seal needs to be maintained with first and second ends 40 and 42 of the vessel. The peripheral members 54 can be attached to the vessel 38 in any suitable fashion, such as by way of adhesive bonding, heat bonding, etc. It would also be possible to integrally form the peripheral members 54 as part of the vessels first and second ends 40 and 42. In that case, however, a means would needed to introduce the dryness-indicating material into the containment chamber 46. Each peripheral member 54 can be secured to the periphery of its associated screen 52 by molding the former in the presence of the screen.

It will be observed that the screens 52, due to their domed shape, each form a protuberance or central raised portion on an inner side thereof that extends into the containment chamber 46 of the vessel 38. The domed shape of each screen 52 likewise forms a plenum-defining cavity on an outer side thereof facing away from the containment chamber 46. Although the screens 52 are shown to be generally rounded in FIGS. 3 and 3*a*, it will be appreciated that other screen shapes, such as conical, frustoconical, etc., could also be used. What is important is that the screens 52 be non-planar in order to help distribute the compressed air/gas through the desiccant 48 from the inlet side of the indicator cartridge 30, and to reduce air/gas pressure drop.

Minimizing pressure drop is an important goal when it is considered that the tool 10 is primarily intended to be used in a compressed air/gas system that already incorporates a conventional filter/dryer in the compressed air/gas line. The existing filter/dryer will normally produce its own pressure drop, and its output pressure may not be significantly higher than what is required by the tool 10. In a painting application, for example, an HVLP (High Volume Low Pressure) spray guns require a minimum pressure of 30-40 psi in order to operate properly. The indicator cartridge 30 must be capable of delivering air or gas at the required pressure, and every effort must be made to avoid reducing the line pressure significantly below what is provided to the inlet side of the cartridge. By virtue of the domed configuration of the screens 52, the indicator cartridge 30 is able to function as a low-pressure-drop dryness indicator apparatus within the tool 10.

The indicator cartridge 30 is designed to be inserted into the cavity 32 through an access port 56 at the bottom of the housing 36. Following insertion of the indicator cartridge 30 through the access port 56, a spacer 58 of generally tubular configuration can be inserted to insure that the indicator cartridge 30 is properly seated within the cavity 32. The spacer 58 also provides an additional plenum at the inlet side of the indicator cartridge 30 to further distribute the compressed air/gas flowing through the desiccant 48 and reduce pressure drop. A removable closure in the form of a retainer fitting 60 is used to cap the access port 56 once the indicator cartridge 30 and the spacer 58 are inserted therein. The retainer fitting 60 is generally tubular in shape and is provided with a central bore 61 to pass compressed air/gas into the cavity 32. A first threaded portion 62 comprising a male thread pattern engages a corresponding female thread pattern formed at the access port 56. A second threaded portion 64 has a male thread pattern that engages a corresponding female thread pattern (not shown) formed in the fitting "F" of the hose line "L" (see FIG. 2). It will be appreciated that one or both of the thread patterns 62 and 64 could be alternatively configured with female threads. In either case, the thread pattern 64 on the retainer fitting 60 is preferably tapered to conform to NPT (National Pipe Thread) standards. The thread pattern 62 can be tapered or non-tapered. The retainer fitting 60 additionally includes a central wrench-receiving portion 66. The wrench-receiving portion 66 is adapted to receive a wrench or other tool when installing the retainer fitting 60 in the access port 56. A resilient "o-ring" seal 68 is disposed adjacent to the wrench-receiving portion 66 (i.e., on the first threaded portion 62) to prevent air/gas leaks. Note that in an alternative construction, the retainer fitting 60 could be integrally formed with the spacer 58, if a design with fewer components was desired.

Once the indicator cartridge 30 is disposed in the cavity 32, and properly positioned by the spacer 58, the desiccant 48 will be visible externally of the tool 10 by virtue of an opening 70 formed in the wall of the housing 36. This opening defines the view port 28 of FIG. 1. The opening 70 is shown in FIG. 3 to be situated on one side of the housing 36. However, a second opening (not shown) of similar configuration could be formed on the opposite side of the housing 36. This would provide two opposing view ports 28 and allow the tool 10 to be used by a right-handed user or a left-handed user with equal dexterity. Note that the opening 70 can be formed as an uncovered aperture in the housing 36, or it could be covered with a transparent or translucent material. It will be appreciated that the opening 70 can be of any suitable shape, and is not limited to the circular shape shown in FIG. 3.

During operation of the tool 10, compressed air or gas will flow into the cavity 32 through the central bore 61 of the retainer fitting 60 seated in the access port 56. The compressed air/gas will enter the area of the spacer 58, which allows the air/gas to disperse cross-sectionally before entering into the indicator cartridge 30 through the (pre-filtering) end closure 50 disposed at the inlet end 42 of the vessel 38. As the compressed air/gas passes through the desiccant 48, this material will respond according to the moisture content of the air or gas. For example, if the desiccant 48 comprises cobalt salt-treated silica gel beads, a deep blue color will indicate that the compressed air/gas is at a satisfactory dryness level, whereas a pink or magenta color will indicate an unsatisfactory dryness level. The compressed air/gas will continue out the (after-filtering) end closure 50 disposed at the outlet end 40 of the vessel 38, and into the flow passage 34, where it is utilized according to the conventional mechanics of the tool 10 (e.g., to deliver paint to be sprayed in a paint gun embodiment of the tool). Because of the positioning of the view port(s) 28 provided by the opening(s) 70, the state of the desiccant 48 can be regularly monitored by the user. In the event that the desiccant 48 does indicate a moisture problem, the user can stop the application and address the problem, thereby greatly reducing the risk of a compromised application, such as a fouled paint job. In most cases, when the moisture problem is corrected and there is a resumption of dry air/gas flow, the desiccant 48 will return to it original color.

After many wet/dry cycles, the performance of the desiccant 48 will degrade, and the desiccant will eventually lose its effectiveness. Moreover, the pre-filtering and after-filtering end closures 40 and 42 of the indicator cartridge 30 will at some point become clogged to the extent that pressure drop becomes excessive. To remedy these conditions, the indicator cartridge 30 is designed as a replaceable active element that can be easily changed out from time to time during the operational life of the tool 10. Promptly replacing the indicator cartridge 30 when problems arise will help ensure that the tool 10 remains in top operating condition.

Figure 4:
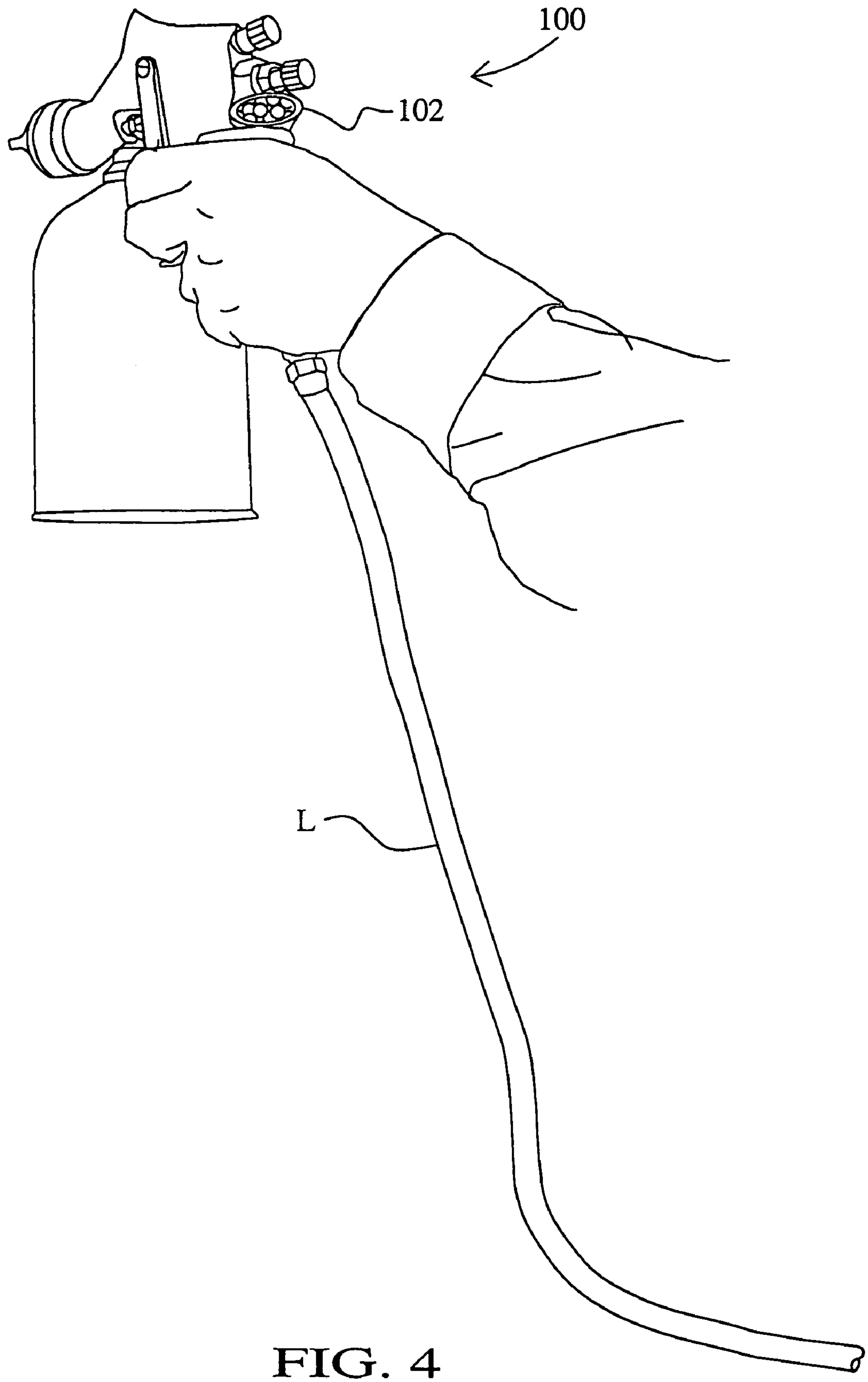
FIG. 4 is a perspective view of an alternative embodiment of an air/gas-driven tool with integrated dryness indicator connected to a compressed air/gas hose line and being held by user in an operational position.

Turning now to FIG. 4, an air/gas-driven tool 100 representing an alternative embodiment of the invention includes an integrated dryness indicator 102 that is disposed on a rear portion of the tool, above where a user's hand would normally be positioned. The indicator 102 may be constructed using a removable indicator cartridge, as described above, or by any other suitable means, such as the electromechanical design described below. With the dryness indicator 102 located at the position shown in FIG. 4, the indicator will directly face the user during operation of the tool 100. In a paint gun application, this placement will allow the dryness of the air/gas stream to be continuously monitored during each sweep of the gun, thereby ensuring the delivery a quality, moisture free application of paint.

Figure 5:
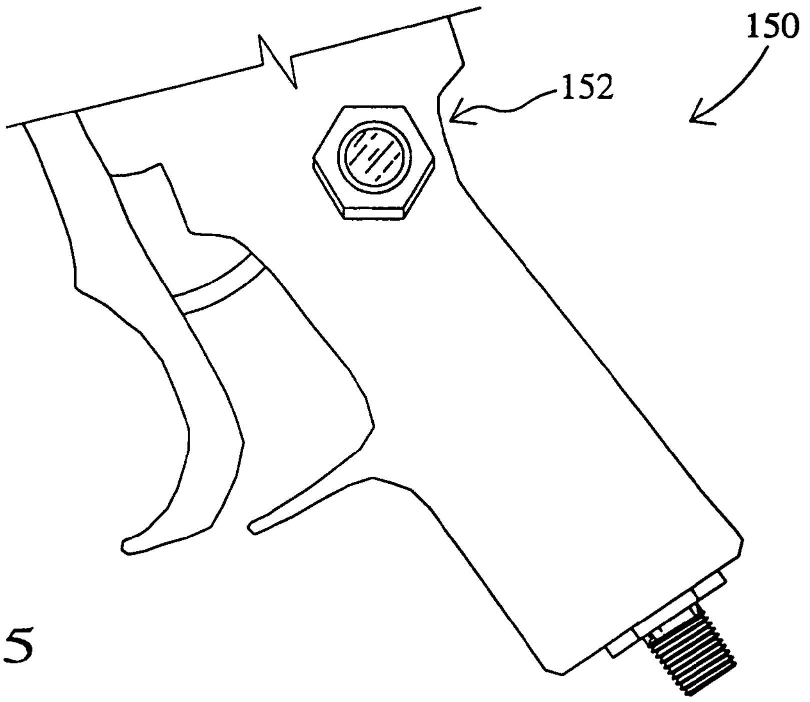
FIG. 5 is a perspective view showing an air/gas-driven tool with integrated dryness indicator constructed in accordance with another exemplary embodiment of the invention.
Figure 6:
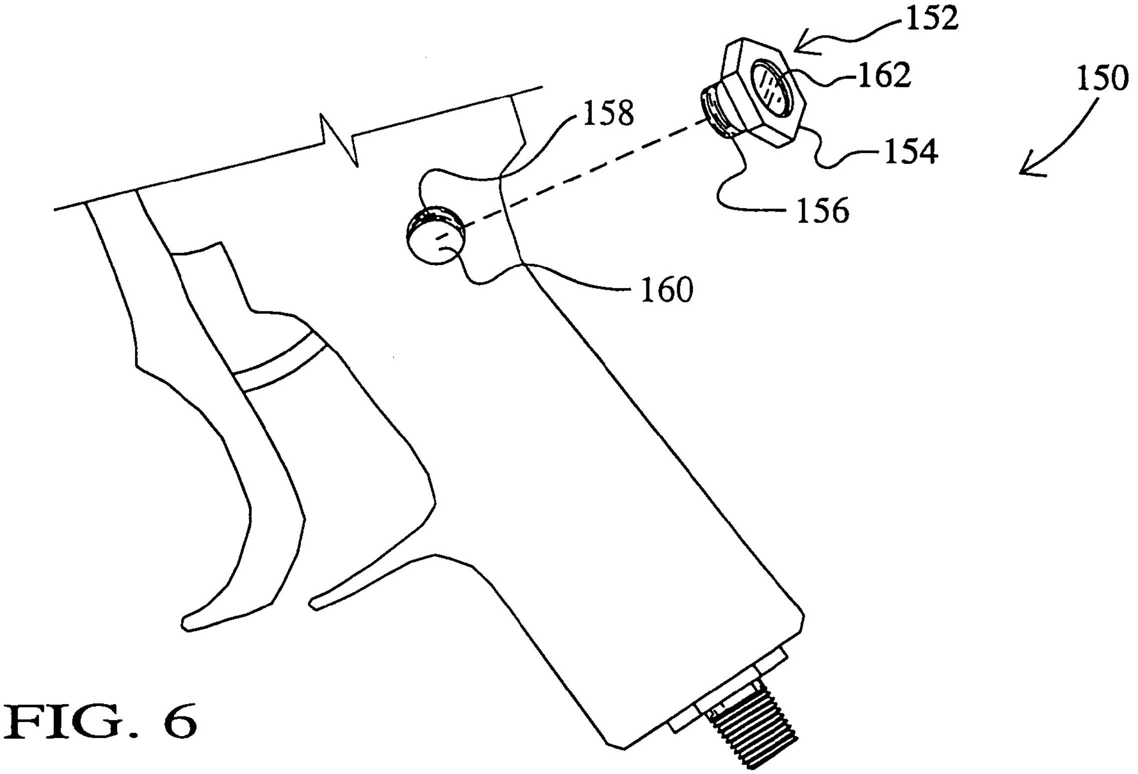
FIG. 6 is a partially exploded perspective view according to FIG. 6 showing dryness indicator separated from the tool in order to illustrate its construction.

FIGS. 5 and 6 illustrate a further alternative embodiment of the invention in which an air/gas-driven tool 150 includes an integrated dryness indicator 152 that is especially adapted for use with moisture sensitive paper. The indicator 152 is configured as removable cartridge that contains the moisture sensitive paper and includes its own view port. The cartridge is adapted to mount to a surface portion of the tool 150, such as the side (or rear) of a handle where a user's hand would normally be positioned. The indicator 152 is thus a replaceable active element that can be easily changed out from time to time during the operational life of the tool 150. It can be constructed in various ways, including as a metal fitting having an outer main body portion 154 of hexagonal or other suitable shape (for receiving a wrench or other tool), and a male-threaded inner stem portion 156. The latter is adapted to be received by female threads 158 formed around an opening 160 that defines a cavity leading to the tool's air/gas flow passage. The body portion 154 of the indicator 152 is hollow so as to define a vessel for containing a quantity of moisture sensitive paper. One end of this vessel is air/gas permeable and in fluid communication with the stem portion 158 of the indicator 152. The stem portion 158 is formed with an interior passage that extends into the cavity, such that the vessel is in fluid communication with the tool's air/gas flow passage. The other end of the vessel is non-permeable and closed by a light transmissive view port 162 made from fire-polished borosilicate glass or the like. The view port 162 allows the moisture sensitive paper to be viewed externally of the vessel. As described above, the moisture sensitive paper could be sprayed onto the inside of the view port 162 in particulate form in combination with a suitable adhesive to form a moisture sensitive paper coating. Alternatively, the moisture sensitive paper could be a paper element that is disposed beneath the view port 162. If desired, a color-changing desiccant could be used in lieu of moisture sensitive paper, assuming the vessel is large enough to carry a sufficient quantity thereof.

Figure 7:
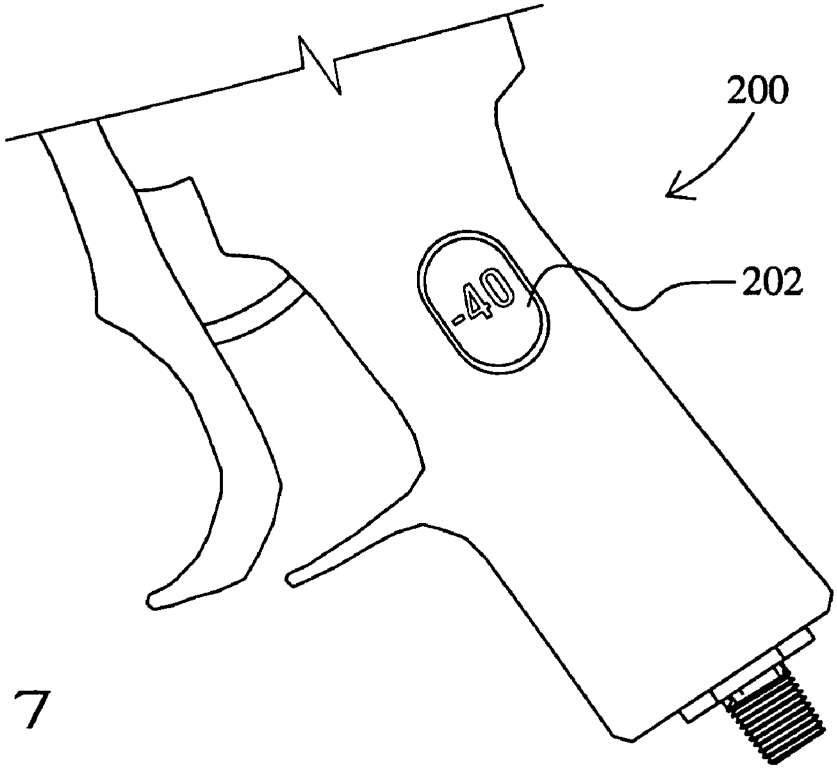
FIG. 7 is a perspective view showing a portion of another embodiment of an air/gas-driven tool with integrated dryness indicator in which a digital readout of compressed air/gas moisture content is provided.
Figure 8:
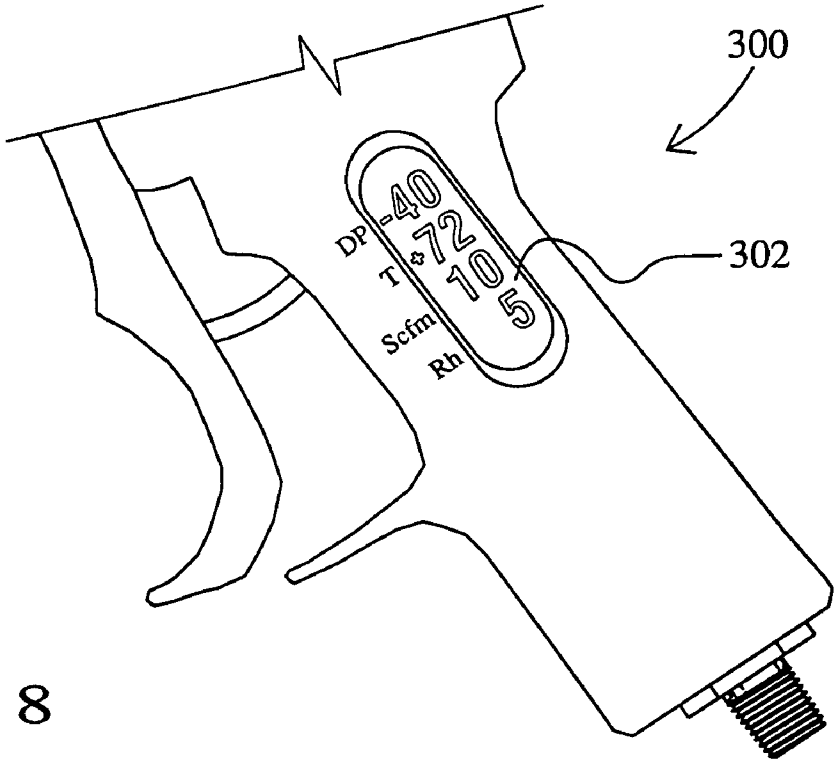
FIG. 8 is a perspective view showing a portion of a still further embodiment of an air/gas-driven tool with integrated dryness indicator in which a digital readout of compressed air/gas moisture content and other operational parameters is provided.

Turning now to FIGS. 7 and 8, two additional air/gas-driven tools 200 and 300 represent additional alternative embodiments of the invention. In FIG. 7, the tool 200 has an integrated dryness indicator 202 on its handle that is implemented with an electronic active display element (battery operated) that displays digital characters of the exact dew point value (dryness) of the compressed air/gas passing through the 200. An output showing the relative humidity of the air/gas stream could optionally be displayed. Operating in conjunction with the display element is an electromechanical detector of conventional design (not shown), which is disposed in an interior air/gas flow cavity of the tool 200 to detect moisture (dew point temperature or relative humidity) in the compressed air/gas stream. In FIG. 8, the tool 300 has an indicated dryness indicator 302 that is part of a suite of indicators the include electronic active display elements (battery operated) that can display all pertinent information associated with the compressed air/gas that is passing through the tool. Such information could include not only the dew point temperature (D P), but also relative humidity (Rh), temperature (T), standard cubic feet per minute (SCFM) flow or even pH. Associated with display elements are electromechanical detectors of conventional design (not shown), which disposed in an interior air/gas flow cavity of the tool 300 to detect moisture and other physical properties of the compressed air/gas stream.

In either of the embodiments of FIGS. 7 and 8, it is to be understood that the electronic display element(s) could be mounted on the upper rear section of the tool, such as at the location illustrated in the embodiment of FIG. 4. In this configuration, the electronic display will directly face the user during nearly all operational positions of the tool.

Although each of the tools 10, 100, 200 and 300 of the above-described embodiments can be attached to a conventional compressed air/gas hose line extending to a conventional filter/dryer system, a tool according to the present invention can also be mounted to the end of a flexible in-line, point-of-use filter/dryer of the type disclosed in the above-referenced provisional application Ser. No. 60/553,163, and which is further disclosed in copending, commonly-owned regular application Ser. No. 10/931,470, now U.S. Pat. No. 7,108,740. The latter application is entitled "Flexible, Inline Point-Of-Use Air/Gas Dryer," and was filed on even date with the present application. The contents of provisional application Ser. No. 60/553,163 and regular application Ser. No. 10/931,470 are both fully incorporated herein by this reference.

Figure 9:
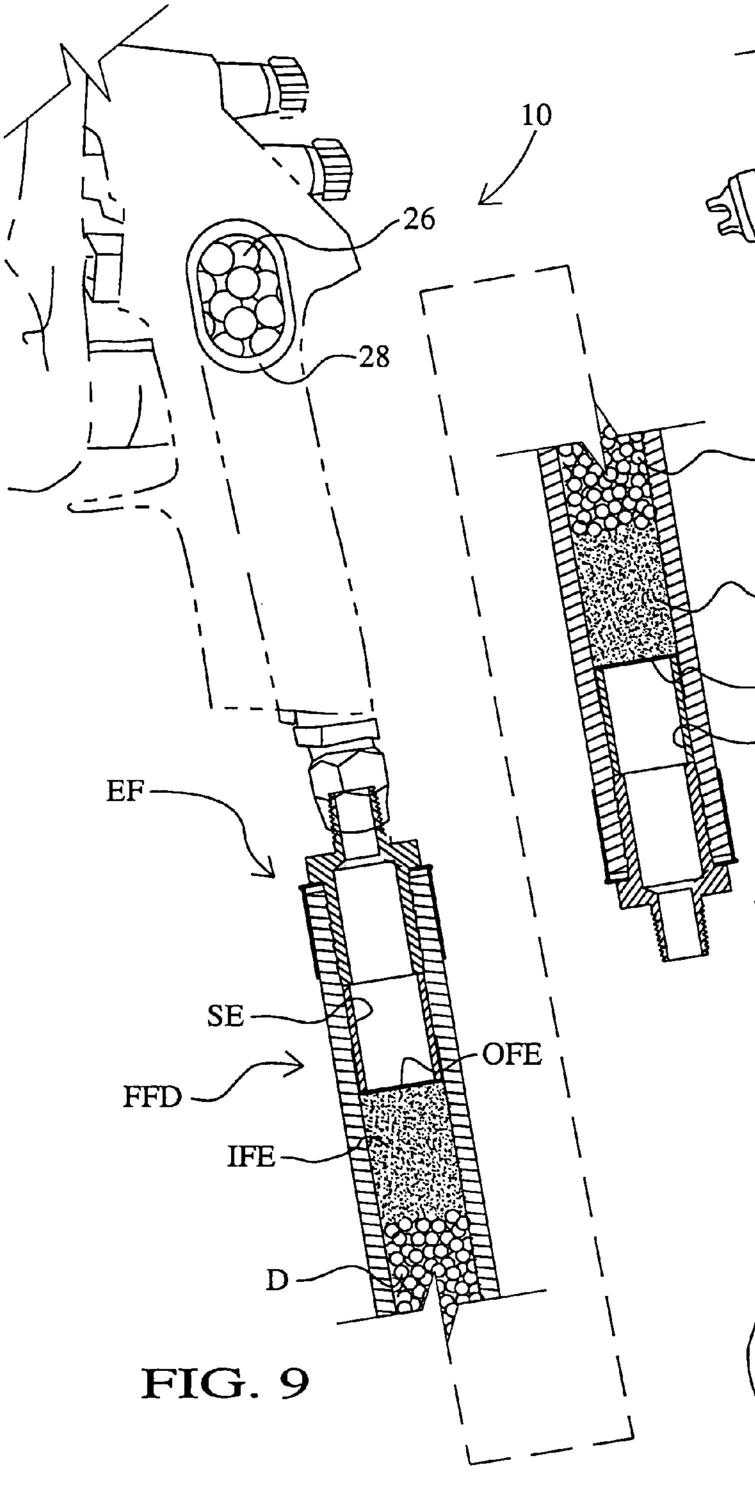
FIG. 9 is a perspective view showing an installation of the integrated tool of FIG. 1 in which the tool is attached to a flexible, inline filter/dryer apparatus, with the ends of the latter being shown in longitudinal cross-section and a central portion thereof being removed for clarity.
Figure 10:
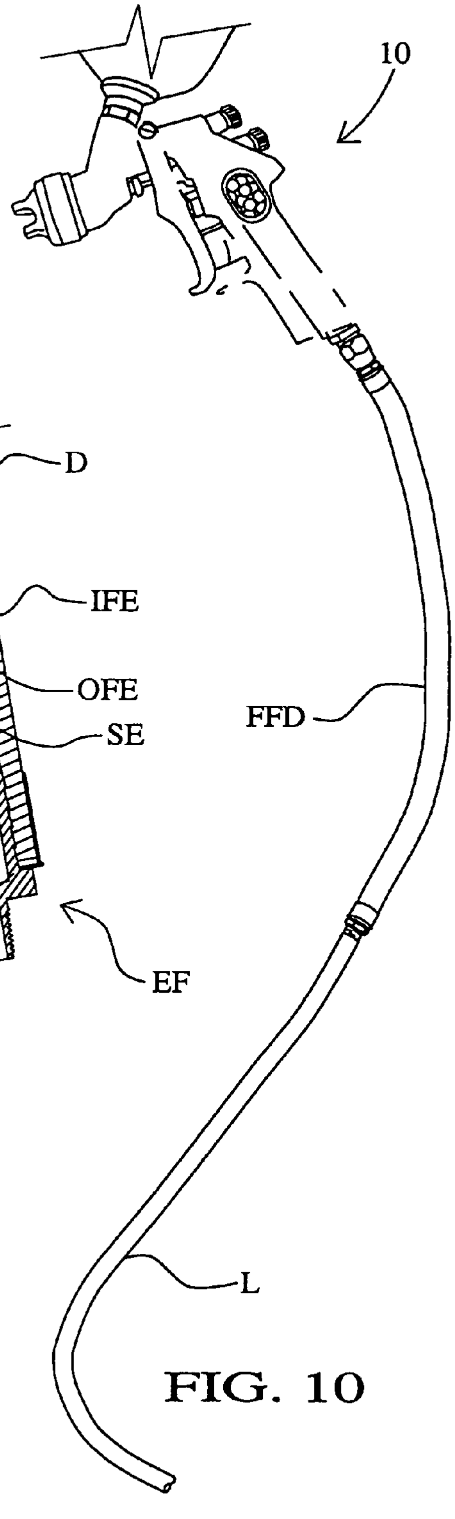
FIG. 10 is a perspective view showing the installation of FIG. 7 with the entire flexible, inline filter/dryer being illustrated, and with the filter/dryer being attached to a compressed air/gas hose line.

As shown in FIGS. 9 and 10 of the present application, the tool 10 of FIG. 1 is attached to the flexible filter/dryer (labeled as "FFD") that is, in turn, connected to a conventional compressed air/gas hose line "L." As best shown in FIG. 9, the filter/dryer FFD comprises an elongated flexible body substantially filled with a moisture adsorbing desiccant "D." The desiccant "D" is retained at each end of the flexible filter/dryer "FFD" by an inline sequence of an inner filter element "IFE," an outer filter element "OFE," a spacer element "SE," and an end fitting "EF" provided with an NPT threaded connector.

Accordingly, a compressed air/gas-driven tool with an integrated dryness indicator has been disclosed according to several exemplary embodiments. The disclosed embodiments of the invention serve an important need in the art of compressed air driven tools, particularly paint spray guns, for users to be apprised of important information concerning the quality of the compressed air/gas being delivered to the tool. In conventional compressed air/gas delivery systems, the user does not know the condition of the delivered compressed air or gas at the point of use in a handheld tool. In a painting application, this deficiency carries the risk of a fouled application as a result of moisture being inadvertently applied along with the paint. The present invention addresses this problem in a low cost effective way. Moreover, by virtue of the replaceable nature of the indicator cartridge, which is the active element of the FIG. 1 embodiment of the dryness indicator, very little maintenance is required. As such, the compressed air driven tool can be always ready for optimum performance.

It should be understood that the description and the drawings herein are merely illustrative, and it is contemplated that various modifications, combinations and changes can be made thereto without departing from the scope of the invention. Moreover, although the tools described herein have been exemplified as a paint gun, other air/gas-driven tools, such as drills, screw drivers, staplers, nailers, die grinders, chisels, impact wrenches and ratchets, sand blasters and sanders, as well as inflation (e.g., tires) devices, could be used with an integrated dryness indicator in accordance with the invention. As such, the invention is not to be in any way limited except in accordance with the spirit of the appended claims and their equivalents.

What is claimed is:

1. An air/gas-driven tool apparatus with an integrated air/gas dryness indicator, comprising:

a hand-operable trigger for actuating said tool apparatus;

a housing defining a cavity;

an air/gas dryness detector in said cavity;

an air/gas flow passage situated to provide a stream of compressed air/gas to said dryness detecting material; and a visual indicator adapted to provide an indication of compressed air/gas dryness detected by said dryness detector.

2. An apparatus according to claim 1, wherein said detector comprises a dryness-indicating material.

3. An apparatus according to claim 2, wherein said dryness-indicating material comprises a color-changing desiccant.

4. An apparatus according to claim 2, wherein said dryness-indicating material comprises a moisture sensitive paper.

5. An apparatus according to claim 1, wherein said detector comprises an electromechanical detector.

6. An apparatus according to claim 1, wherein said visual indicator comprises a view port into said cavity.

7. An apparatus according to claim 1, wherein said visual indicator comprises a display element adapted to indicate one or both of relative humidity and dew point temperature.

8. An apparatus according to claim 1, wherein said visual indicator is on a side of a handle portion of said apparatus.

9. An apparatus according to claim 1, wherein said visual indicator is on opposing sides of a handle portion of said apparatus.

10. An apparatus according to claim 1, wherein said visual indicator is on a rear portion of said apparatus.

11. An apparatus according to claim 1, further including one or more additional indicators adapted to indicate one or more of compressed air/gas flow, pressure, and temperature.

12. An apparatus according to claim 1, wherein said visual indicator is adapted to indicate relative humidity and dew point temperature, and wherein said apparatus further includes indicators for indicating compressed air/gas flow, pressure and temperature.

13. An air/gas-driven tool apparatus with an integrated air/gas dryness indicator, comprising:

a hand-operable trigger for actuating said tool apparatus;

a housing defining a cavity;

said cavity being in fluid communication with an air/gas flow passage adapted to carry a stream of compressed air/gas;

an indicator assembly removably disposed in said cavity;

said indicator assembly comprising a light transmissive vessel containing a dryness indicating material therein; and a view port in said housing for viewing of said dryness indicating material in said indicator assembly.

14. An apparatus according to claim 13, wherein said dryness indicating material comprises a color-changing desiccant.

15. An apparatus according to claim 13, wherein said dryness indicating material comprises a moisture sensitive paper.

16. An apparatus according to claim 13, wherein said view port is situated on a side of a handle portion of said apparatus.

17. An apparatus according to claim 16, wherein there are two view ports on opposing sides of said handle portion.

18. An apparatus according to claim 13, wherein said view port is on a rear portion of said apparatus.

19. An apparatus according to claim 13, wherein said vessel has a first end, a second end, and a central portion defining a containment chamber for said dryness-indicating material.

20. An apparatus according to claim 19 wherein said indicator assembly further includes first and second gas/permeable closures respectively capping said first and second ends of said vessel.

21. An apparatus according to claim 20, wherein said closures are each formed with a central raised portion on an inner side thereof extending into said containment chamber and a plenum-defining cavity on an outer side thereof facing away from said containment chamber.

22. An apparatus according to claim 13, further including a removable retainer fitting on said cavity adapted to facilitate insertion and removal of said indicating assembly in said cavity.

23. An apparatus according to claim 13, further including a positioning spacer on an inlet side of said indicating assembly.

24. An indicator cartridge apparatus for removable integration with an air/gas-driven tool, comprising:

a vessel having first and second ends and a central portion disposed between said first and second ends;

said central portion of said vessel defining a containment chamber for containing a desiccant material and which is light transmissive so that said desiccant material can be viewed externally of said vessel;

a dryness-indicating, color-changing desiccant material in said containment chamber;

first and second air/gas-permeable closures at each end of said containment chamber for retaining said desiccant material, said closures each including a non-planar central portion that creates a protuberance on a first side thereof extending into said containment chamber and a plenum-defining cavity on a second side thereof facing away from said containment chamber; and said indicator cartridge being sized and configured to be received in a cavity formed in a housing of an air/gas-driven tool.

25. An apparatus according to claim 24, wherein said vessel comprises a borosilicate glass tube.

26. An apparatus according to claim 24, wherein said vessel is generally tubular.

27. An apparatus according to claim 24, wherein said desiccant comprises silica gel beads treated with a cobalt salt.

28. An apparatus according to claim 27, wherein said desiccant comprises desiccant beads having a diameter ranging from about 0.1 to 0.125 inches.

29. An apparatus according to claim 24, wherein said end closures comprise domed screens.

30. An apparatus according to claim 24, wherein said end closures comprise peripheral portions on said first and second ends of said vessel.

31. An apparatus according to claim 24, wherein said end closures comprise non-planar screens and peripheral members on said first and second ends of said vessel.

32. An apparatus according to claim 31, wherein said peripheral members comprise a ring portion engaging said first and second ends of said vessel.

33. An apparatus according to claim 32, wherein said peripheral members further comprise an interior stub portion that engages an interior wall of said vessel and mounts said non-planar screen.

34. An air/gas-driven tool apparatus with an integrated air/gas dryness indicator, comprising:

a hand-operable trigger for actuating said tool apparatus;

a housing defining a cavity;

said cavity being in fluid communication with an air/gas flow passage adapted to carry a stream of compressed air/gas;

an indicator assembly removably mounted on a surface of said tool and in fluid communication with said cavity;

said indicator assembly comprising a vessel containing a dryness indicating material therein; and said vessel including a view port for viewing said dryness indicating material in said indicator assembly.

35. An apparatus according to claim 34, wherein said dryness indicating material comprises a moisture sensitive paper.

36. An apparatus according to claim 34, wherein said dryness indicating material comprises a color-changing desiccant.

37. An apparatus according to claim 34, wherein said indicator assembly is situated on a handle portion of said apparatus.

38. An apparatus according to claim 34, wherein said indicator assembly comprises a main body portion that is exterior to said cavity and hollow stem portion that is threadably received in said cavity.

39. An apparatus according to claim 38, wherein said main body portion defines a vessel that contains said dryness-indicating material.

40. An apparatus according to claim 38, wherein said vessel has a first end air/gas permeable end in fluid communication with said air/gas flow passage via said stem and said cavity, and a second non-permeable end.

41. An apparatus according to claim 40 wherein said non-permeable end of said vessel is provided by said view port.

42. An apparatus according to claim 41, wherein said view port comprises fire-polished borosilicate glass.

43. An apparatus according to claim 42, wherein said dryness-indicating material comprises a moisture sensitive paper coating on an inner side of said view port.

44. An apparatus according to claim 42, wherein said dryness-indicating material comprises a moisture sensitive paper element disposed on an inner side of said view port.

45. An indicator cartridge apparatus for removable integration in an air/gas-driven tool, comprising:

an indicator assembly adapted to be removably mounted on a surface of said tool and in fluid communication with a cavity defined in a tool housing, said cavity being itself in fluid communication with an air/gas flow passage of said tool;

said indicator assembly comprising an exteriorly threaded fitting having plural surfaces for receiving a wrench or other tool and a vessel containing a dryness indicating material therein;

said dryness indicating material comprising a color-changing desiccant; and said vessel including a view port for viewing said dryness indicating material in said indicator assembly.

46. An apparatus according to claim 45, wherein said indicator assembly is adapted to be situated on a handle portion of said apparatus.

47. An apparatus according to claim 45, wherein said indicator assembly comprises a main body portion that is adapted to remain exterior to said cavity and a hollow stem portion that is adapted to be threadably received in said cavity.

48. An apparatus according to claim 47, wherein said main body portion defines said vessel that contains said dryness-indicating material.

49. An apparatus according to claim 47, wherein said vessel has a first air/gas permeable end adapted for fluid communication with said air/gas flow passage via said stem and said cavity, and a second non-permeable end.

50. An apparatus according to claim 49 wherein said non-permeable end of said vessel is provided by said view port.

51. An apparatus according to claim 50, wherein said view port comprises fire-polished borosilicate glass.

* * * * *